(12) United States Patent
Angaluri

(10) Patent No.: US 8,365,175 B2
(45) Date of Patent: Jan. 29, 2013

(54) POWER MANAGEMENT USING DYNAMIC APPLICATION SCHEDULING

(75) Inventor: Srihari Venkata Angaluri, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 12/400,845

(22) Filed: Mar. 10, 2009

(65) Prior Publication Data

US 2010/0235840 A1    Sep. 16, 2010

(51) Int. Cl.
G06F 9/46      (2006.01)
G06F 1/00      (2006.01)
G06F 1/26      (2006.01)
G06F 1/32      (2006.01)
G06F 11/30     (2006.01)

(52) U.S. Cl. ......... 718/102; 713/300; 713/320; 713/340
(58) Field of Classification Search .................. None
See application file for complete search history.

(56) References Cited

U.S. PATENT DOCUMENTS

| | | | |
|---|---|---|---|
| 6,173,408 B1 * | 1/2001 | Jimbo et al. | 713/322 |
| 6,859,882 B2 | 2/2005 | Fung | |
| 7,032,119 B2 | 4/2006 | Fung | |
| 7,058,826 B2 | 6/2006 | Fung | |
| 7,174,468 B2 | 2/2007 | Gary et al. | |
| 7,237,129 B2 | 6/2007 | Fung | |
| 7,272,730 B1 | 9/2007 | Acquaviva et al. | |
| 7,337,433 B2 | 2/2008 | Cyran et al. | |
| 8,028,179 B2 * | 9/2011 | Zettler | 713/320 |
| 2003/0200473 A1 | 10/2003 | Fung | |
| 2007/0067657 A1 * | 3/2007 | Ranganathan et al. | 713/320 |
| 2007/0232254 A1 | 10/2007 | Mackey et al. | |
| 2008/0098242 A1 * | 4/2008 | Peterson | 713/320 |
| 2008/0209243 A1 * | 8/2008 | Ghiasi et al. | 713/320 |
| 2009/0307696 A1 * | 12/2009 | Vals et al. | 718/102 |

OTHER PUBLICATIONS

David P. Bunde, "Power-Aware Scheduling for Makespan and Flow", Department of Computer Science University of Illinois at Urbana, SPAA'06, Jul. 30-Aug. 2, 2006, pp. 190-196.
Peter Bodik, et al.,"Adaptive Power Management/Vision", RDA Lab, http://radlab.cs.berkeley.edu/wiki/Adaptive_Power_Management/Vision, Nov. 12, 2008, 5 pages.
Wikipedia "Batch Processing", http://en.wikipedia.org/wiki/Batch_processing, Feb. 3, 2009, pp. 1-2.
Wikipedia "Multithreading: Advantages/Uses", http://en.wikipedia.org/wiki/Thread_(computer_science), Feb. 3, 2009, p. 1-1.

(Continued)

*Primary Examiner* — Eddie P Chan
*Assistant Examiner* — William B Partridge
(74) *Attorney, Agent, or Firm* — Cynthia G. Seal; Jeffrey L. Streets

(57) ABSTRACT

One embodiment provides a method of managing power in a datacenter having a plurality of servers. A number of policy settings are specified for the power center, including a power limit for the datacenter. The power consumption attributable to each of a plurality of applications executable as a job on one or more of the servers is determined. The power consumption attributable to each application may be further qualified according to the type of server on which the application is executed. Having determined the power consumption attributable to various applications executable as jobs, the applications may be executed on the servers as jobs such that the total power consumption attributable to the currently executed jobs remains within the selected datacenter power limit.

14 Claims, 4 Drawing Sheets

OTHER PUBLICATIONS

Wikipedia "High-Performance Computing", http://en.wikipedia.org/wiki/High-performance_computing, Feb. 3, 2009, pp. 1-2.
Wikipedia "Web 2.0", http://en.wikipedia.org/wiki/Web_2.0, Feb. 3, 2009, pp. 1-10.
Wikipedia "Cluster (computing)", http://en.wikipedia.org/wiki/Computer_cluster, Feb. 4, 2009, pp. 1-9.
Rountree, et al. "Bounding Energy Consumption in Large-Scale MPI Programs", Association for Computing Machinery (ACM), SC07 Nov. 10-16, 2007, 9 pages.
Parallel Data Lab, "Data Center Observatory", http://www.pdl.cmu.edu/DCO/, updated Aug. 13, 2008, 3 pages.
Min Xu et al. "A Serializability Violation Detector for Shared-Memory Server Programs", Chicago, Illinoise, PLDI'05, Jun. 12-15, 2005, pp. 1-14.
Yiyu Chen, "Managing Server Enerty and Operational Costs N Hosting Centers", Penn State University, University Park, PA, SIGMETRICS'05, Jun. 6-10, 2005, pp. 303-314.
Standard Performance Evaluation Corporation SPEC Power and Performance—Benchmark Methodology V1.1), May 28, 2008, pp. 1-27.

* cited by examiner

POWER MANAGEMENT USING DYNAMIC APPLICATION SCHEDULING

BACKGROUND OF THE INVENTION

1. Field of the Invention

The present invention relates to scheduling software jobs and managing power in a datacenter.

2. Background of the Related Art

The amount of power consumed by the equipment in a modern datacenters represents a significant expense, even in relation to the cost of the equipment itself. A modern datacenter may include as many as tens of hundreds of high-power, rack-mounted servers disposed in high-density enclosures. Management of the power consumed by this equipment is an important consideration in the design and operation of any datacenter.

Attempts to optimize power consumption may be multi-faceted. On one level, for example, power consumption may be reduced by improving datacenter layout and component selection. On another level, the design of individual components can affect the overall efficiency of a server or other device. Power management solutions may include both hardware and software aspects aimed at improving various aspects of power utilization.

BRIEF SUMMARY OF THE INVENTION

One embodiment of the present invention provides a method of managing power in a datacenter having a plurality of servers. A power limit may be selected for a datacenter. A power consumption attributable to each of a plurality of applications executable on one or more of the servers is determined. The applications are scheduled for execution on the servers as jobs. Execution of the jobs is controlled such that the total power consumption attributable to the currently executed jobs remains within the selected datacenter power limit.

DETAILED DESCRIPTION OF THE INVENTION

One embodiment of the present invention is directed to a computer-implemented method for scheduling jobs in a datacenter to achieve a desired power envelope. The desired power envelope may be one of several site-specific policy settings used to schedule requested jobs. The power envelope may include an upper datacenter power limit and a lower datacenter power limit. The power consumption attributable to each of the various jobs may be determined in advance of scheduling the applications as jobs. A set of job requests are subsequently received for execution on the servers. The jobs may be scheduled and executed according to the various policy settings, and in a manner that the total power consumption attributable to the jobs remains within the selected power envelope.

The method may be implemented by a job scheduler tasked with enforcing multiple site-specific policy settings, in addition to the policy setting that specifies the desired power envelope. Examples of other site-specific policies include the prioritization of jobs based on users, queues, or applications, job interdependencies (e.g., job X depends on successful completion of job Y), "fairshare" policies (e.g. % utilization of resources should be at least 90% at any time), and so forth. According to one embodiment, the desired power envelope is enforced in conjunction with the other site-specific policies. The various policy settings may be prioritized, such that any conflict between policies may be resolved according to priority. For example, the policy to enforce the desired power envelope may be assigned a higher priority than other policy settings, such that the power envelope is enforced even when doing so would cause a delay in executing a job that, according to another policy setting, might have otherwise been started sooner.

Figure 1:
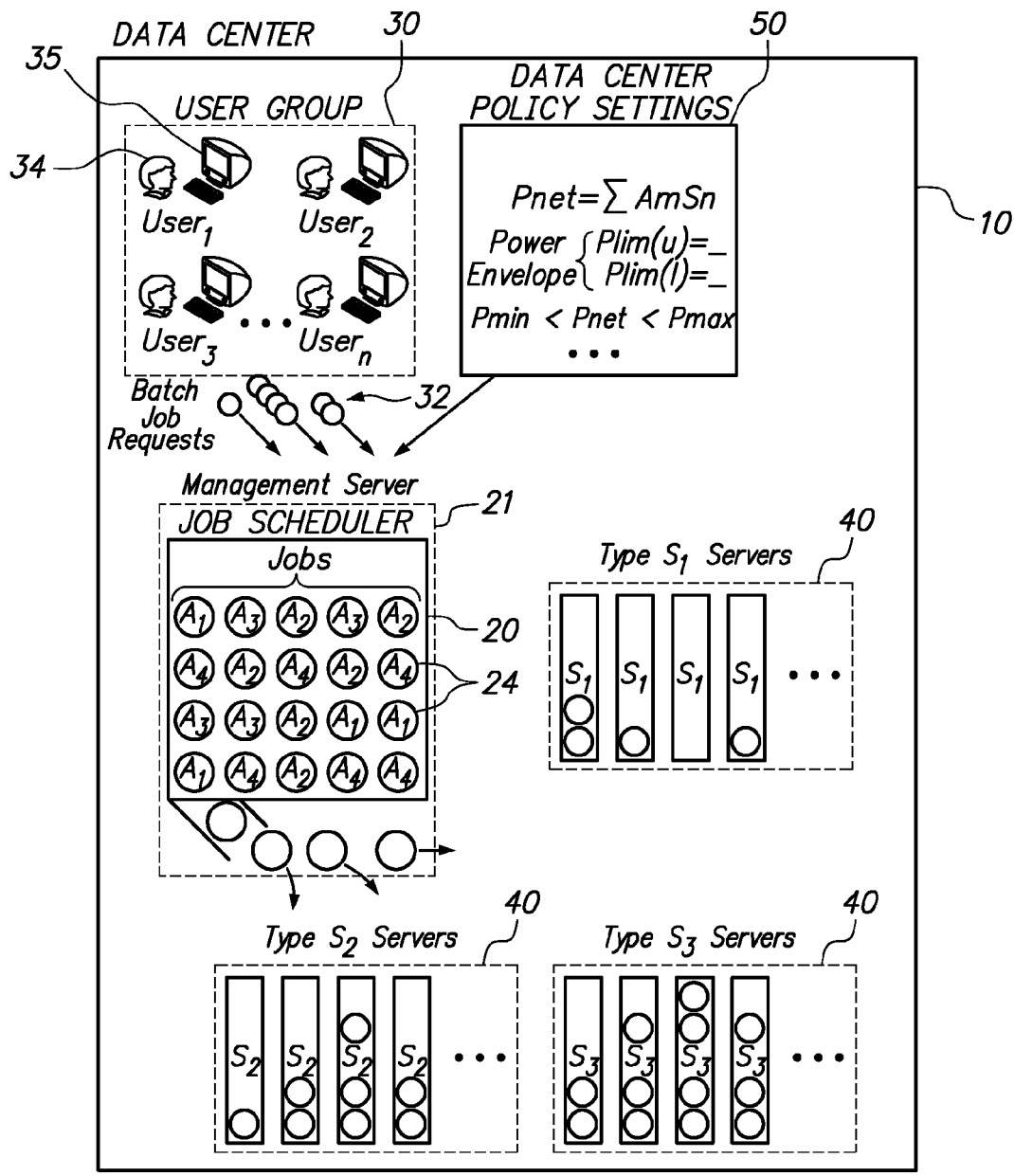
FIG. 1 is a schematic diagram of a datacenter that is power-managed according to an embodiment of the invention.

FIG. 1 is a schematic diagram of a datacenter 10 that is power-managed according to an embodiment of the invention. The datacenter 10 may be a "server farm" having as many as tens of hundreds of servers 40. The servers 40 may be electronically linked in one or more "clusters" (not shown) wherein the servers in each cluster work closely together so that the cluster emulates a single server having the combined computing power of the servers belonging to the cluster. The servers are categorized by type $S_n$, as further discussed below, though a cluster need not be limited to only one type of server. Additional servers 40 may be provided as redundant servers to improve the reliability of operations and to protect against potential data loss. The large amount of power consumed and heat generated by the many servers 40 in the datacenter 10 requires judicious management of power. Therefore, according an embodiment of the invention, datacenter policy settings 50 are assigned to the datacenter 10, including one or more policy settings directed to how the datacenter 10 consumer power. A job scheduler 20 provided on a management server 21 schedules and selectively executed the jobs 24 in a manner that enforces the datacenter policy settings 50.

The policy settings 50 may be selected by a computer administrator or system designer in view of operating considerations such as the computing objectives of the datacenter operator and its clients, and the operating budget of the datacenter. The policy settings 50 include power management settings such as how much power may be consumed by the datacenter 10. The policy settings 50 may further specify how the allowable power consumption may vary over time due to, for example, hourly and daily fluctuations in energy costs, the schedules of datacenter personnel who may be affected by the noise and heat generated by the datacenter 10, or scheduled maintenance of the datacenter 10.

The policy settings 50 in this embodiment include the specification of a power envelope within which the datacenter 10 should operate. The power envelope is a range of power values between an upper datacenter power limit "$P_{lim}(u)$" and a lower datacenter power limit "$P_{lim}(1)$." The upper datacenter power limit may have any value (e.g. a specified number of Watts), but is typically less than the maximum power that the datacenter 10 is capable of consuming. The lower datacenter power limit may be have any value less than the upper datacenter power limit, but is typically greater than the power consumed when all of the servers 40 are idling. For example, while it may not be economical to run the servers 40 at full power during peak hours (when energy costs are highest), it also may not be desirable to idle the servers 40 for any appreciable length of time in view of the capital investment in the datacenter 10. The upper and lower datacenter power limits may be dynamic, in view of the time-varying considerations described above, such as fluctuations in energy costs.

A client group 30 includes any number of client workstations 35 in communication with a management server 21 and in communication with the servers 40, such as over a network. Each client workstation 35 typically includes multiple user input/output devices, such as a keyboard, a mouse, trackball, joystick, or other pointing device, and a display, allowing a user 34 to interface with the management server 21. Each client workstation 35 may include its own processor(s) and memory, or may instead be a "thin client" that relies heavily on the processing and memory capabilities of the management server 21 and the servers 40 in the datacenter 10.

The users 34 use the client terminals 35 to input requests to perform specific jobs, i.e. job requests 32, on the servers 40. Each job 24 (also known as a "task" or "process") is a single instance of a software application $A_m$ to be executed, where the value of the subscript "m" is used herein to designate which of a number of different applications is to be executed. Each job request 32 includes a request for one or more jobs 24 to be executed. Multiple instances of a particular application may be executed simultaneously in the datacenter 10. For example, application $A_3$ may be a database application that is run on one server 40 using one data set and simultaneously on another server 40 using another data set. Each job request 32 may further specify the server type $S_n$ each requested job 24 is to be run on, where the value of the subscript "n" designates which of a number of different server types a requested application is to be executed on. Each server type $S_n$ may specify a predetermined hardware and software configuration, or narrow range thereof, such that each server of the same type $S_n$ can be expected to have the same or similar computing performance and capabilities.

The job requests 32 are sent to the management server 21, where the scheduling software 20 automates the execution of the requested jobs 24 using batch processing. In particular, the scheduling software 20 queues the jobs 24 to be executed and selectively executes the queued jobs 24 on the servers 40 in a manner that achieves the datacenter policy settings 50. One of the exemplary policy settings 50 specifies that the total power consumption of the servers 40 in the datacenter 10 should remain within specified upper and lower datacenter power limits. The policy setting may be expressed as $P_{lim}(1) < P_{tot} < P_{lim}(u)$. Thus, the scheduling software 20 controls the execution of the queued jobs 24 in a manner that maintains the total power consumption of the servers 40 within the upper and lower datacenter power limits. A method for enforcing the policy setting $P_{lim}(1) < P_{tot} < P_{lim}(u)$ is further described below.

Figure 2:
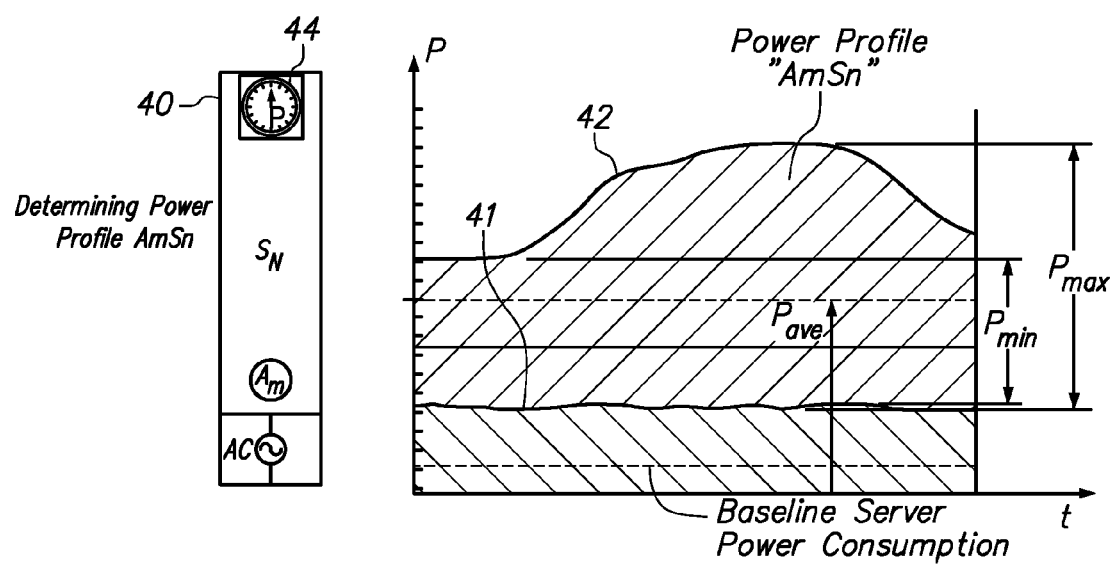
FIG. 2 is a schematic diagram illustrating the determination of a power profile for a particular application as executed on a particular server type.

FIG. 2 is a schematic diagram illustrating the determination of a power profile "$A_m S_n$" for a particular application $A_m$ as executed on a server 40 having a particular server type $S_n$. A power meter 44 is provided to measure the power consumed by the server 40. The power meter 44 may include hardware and/or software elements generally known in the art for measuring the power consumption of a server. For example, the power meter 44 may use aspects of a methodology known in the art as "SPEC Power," provided by the Standard Performance Evaluation Corporation, to measure how much power a server consumes. In another example, the power meter 44 may be or include a baseboard management controller (BMC) used to monitor real-time power consumption by a server. However, the power meter 44 is not limited to the use of either SPEC Power or a BMC, and other known or future-developed tools may be used for measuring power in accordance with one or more embodiment of the invention.

The power meter 44 may be used in a method of determining the amount of power attributable to a particular application. A baseline power consumption for a particular server type $S_n$ may be measured over a period of time using the power meter 44, prior to executing the application $A_m$ on the type $S_n$ server. An exemplary baseline power consumption is plotted in FIG. 2 as a lower power curve 41. Subsequently, the application $A_m$ may be initiated on the server 40 of same type $S_n$, and the power meter 44 may be used to obtain an increased power consumption resulting from the execution of the application $A_m$ on the server 40. The power consumption during execution of the application $A_m$ is plotted as an upper power curve 42. The amount of power consumption attributable solely to the execution of the application $A_m$ on the type $S_n$ server 40 may then be determined by subtracting the baseline power consumption from the increased power consumption during execution of the application $A_m$, which in the context of FIG. 2 would be equivalent to subtracting the lower power curve 41 from the upper power curve 42.

The power profile $A_m S_n$ is visually indicated by the shaded portion of the chart between the upper power curve 42 and the lower power curve 41. Because each server of a particular type $S_n$ has the same or similar configuration along with the same or similar computing performance and capabilities, the power profile for a particular application $A_m$ on a particular server type $S_n$ is assumed to be representative of the power profile for that application Am on every server of type $S_n$. By knowing the power consumption attributable to the execution of applications $A_m$ on a server of type $S_n$, the expected power consumption in the datacenter 10 as a result of running jobs in the datacenter 10 may then be estimated according to which applications are running on which servers.

The power profile for each application can be quantified in terms of a variety of power parameters. One such power parameter is the maximum power consumption $P_{max}$ attributable to the application $A_m$ on server type $S_n$, and is determined as the difference between the highest observed value of the upper power curve 42 and the lowest observed value of the lower power curve 41. Similarly, the minimum power consumption $P_{min}$ attributable to the application $A_m$ on server type $S_n$, is determined as the difference between the lowest observed value of the upper power curve 42 and the highest observed value of the lower power curve 41. An average power consumption $P_{ave}$ (measured vertically from the horizontal axis) is another power parameter that can be used to describe the power profile for an application $A_m$ on server $S_n$. $P_{ave}$ is the average power consumption attributable to the application $A_m$ on server type $S_n$ during the recorded time interval, and is equal to the average between the upper power curve 42 and the lower power curve 41 over the period of time for which the upper power curve 42 and the lower power curve 41 are taken.

Because the baseline power consumption is subtracted from the power consumption during execution of an application to determine parameters of the power profile, the baseline power consumption may be the power consumption of any previously fixed set of processes running on the server. However, any variability of the baseline power consumption over time will cause the maximum power consumption $P_{max}$ attributable to the application $A_m$ on server type $S_n$ to be overestimated and the minimum power consumption $P_{min}$ to be underestimated. This uncertainty may be minimized by minimizing the variability of the baseline power consumption. In particular, one way to minimize the variability of the baseline power consumption is to determine the baseline power consumption when the server 40 is idling. When the server 40 is idling, the power fluctuation is typically quite small, resulting in the fairly flat lower power curve 41 in FIG. 2.

The upper power curve 42 a substantial amount of variability, however, indicating that the application accesses power-consuming server resources, such as processor and memory, at different intensities as the application proceeds. In this example, the upper power curve 42 initially increases as the application $A_m$ ramps up, then plateaus near its peak power consumption, and finally decreases gradually as the application $A_m$ approaches completion. Thus, even if the baseline power consumption were perfectly constant, the power profile would include a range of power (and not a single, point value) attributable to the execution of application $A_m$.

Figure 3:
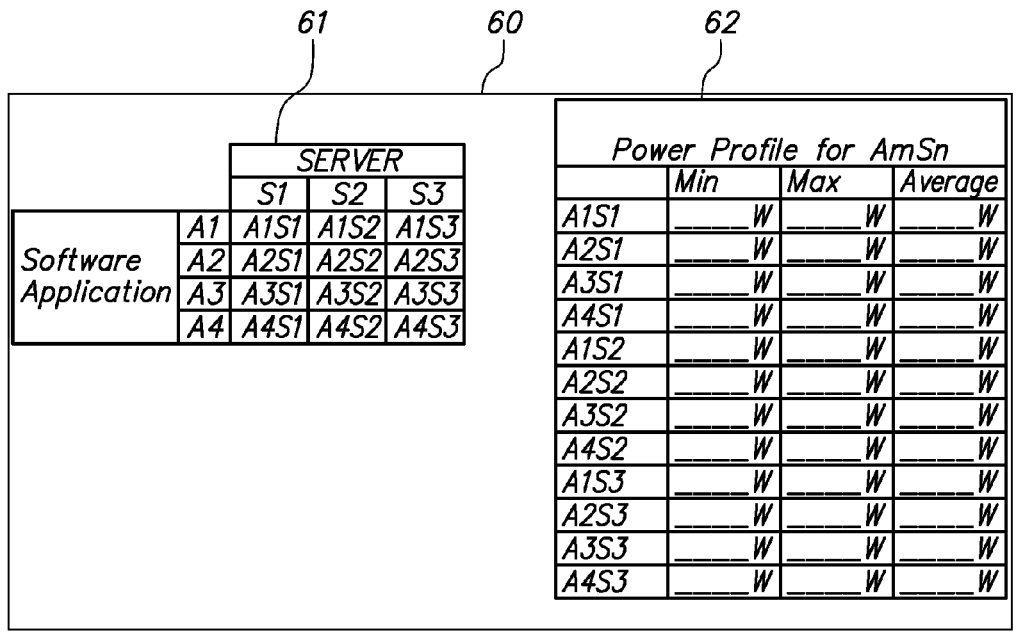
FIG. 3 is a database summarizing some power profile data for three servers and four applications.

FIG. 3 is a database summarizing some power profile data for three server types $S_1$, $S_2$, $S_3$ and four applications $A_1$, $A_2$, $A_3$, $A_4$. A power profile denoted "$A_m S_n$" may be uniquely determined for each application $A_m$ as executed on each server type $S_n$. A total of m*n power profiles may be determined for m applications on n different server types. Table 61 summarizes the different power profiles that may be determined for 4 applications $A_1$-$A_4$ and 3 server types $S_1$-$S_3$. Table 62 lists parameters $P_{max}$, $P_{min}$, and $P_{ave}$ of the twelve total power profiles for applications $A_1$-$A_4$ on server types $S_1$-$S_3$. Values for these parameters may be electronically stored in memory and used by a job scheduler to determine the expected power consumption $P_{tot}$ of the datacenter based on the various applications running on the servers.

Figure 4:
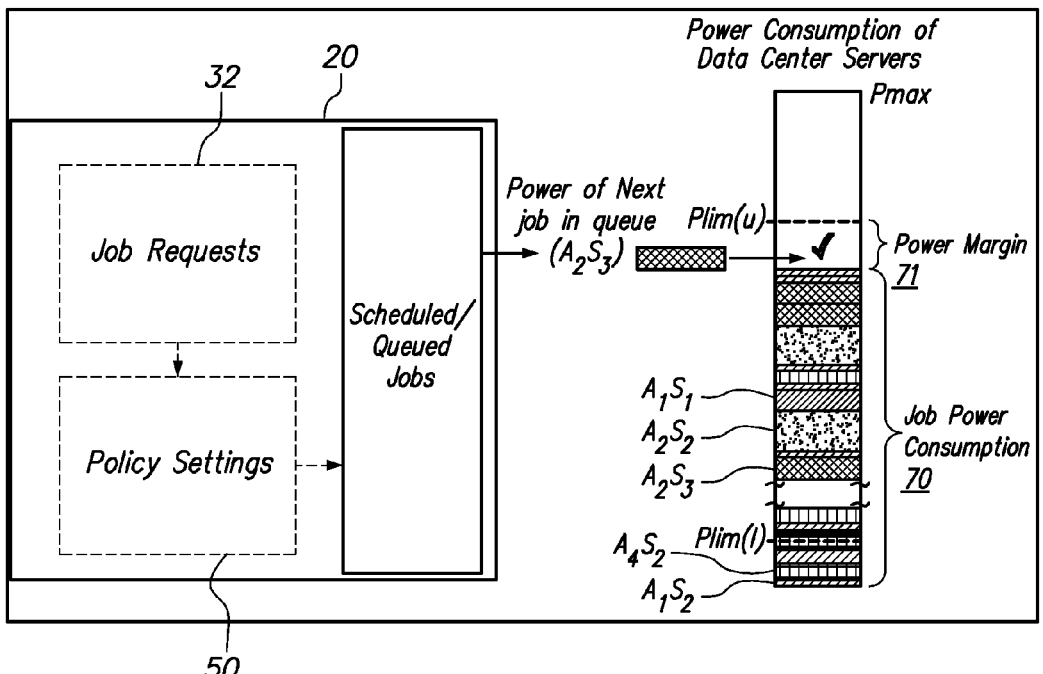
FIG. 4 is a schematic diagram illustrating an example of selectively executing scheduled jobs in a manner that enforces the power envelope policy setting.

FIG. 4 is a schematic diagram illustrating an example of selectively executing scheduled jobs in a manner that enforces the power envelope policy setting. The job scheduler 20 receives job requests 32 and applies a number of site-specific policy settings 50 to the job requests 32 to schedule and execute the requested jobs. The various policy settings may affect such scheduling aspects as the preferred order and timing of executing the jobs. The power envelope policy setting is continually applied to ensure that the total power allocated to the jobs being executed remains within the power envelope. The job requests 32 are a dynamic set of job requests, with new job requests being periodically received and previously scheduled jobs eventually being completed. Thus, the scheduled jobs awaiting execution at any given moment may be considered to be "in queue" for execution.

An inset chart entitled "Power Consumption of Datacenter Servers" illustrates the power consumption attributable to a set of jobs. The power envelope includes an upper datacenter power limit $P_{lim}(u)$ and lower datacenter power limit $P_{lim}(1)$, indicated by dashed horizontal lines. The power attributable to each job (i.e. each instance of a particular application being run on a server) is represented by a rectangle. Each job has an associated power profile $A_m S_n$. Each unique power profile is represented by a different hatch pattern. The height of each rectangle represents the power consumption attributable to the executed jobs based on the power profile; the width of each rectangle has no significance in this chart. The height of each rectangle may indicate, for example, the average power attributable to the job $P_{ave}$ or, more conservatively, the maximum power $P_{max}$ attributable to the job (see FIG. 2). The total power consumption (70) of the set of jobs is represented by the combined height of the individual rectangles.

In factoring in the various policy settings 50 used to schedule jobs, the job scheduler 20 also considers the total power attributable to a prospective set of jobs based on the individual power profiles, so that the total power consumption of the set of jobs will remain within the power envelope. The various policy settings may be prioritized to resolve any instances of conflicting policy settings that may occur. In this example, the power envelope is the highest priority policy setting, to ensure that the power consumption of servers in the datacenter remains within the power envelope.

As jobs are completed and new jobs are begun as selected according to the various policy settings, the job scheduler 20 continues to consider the total power attributable to jobs currently being executed to enforce the power envelope policy setting. For example, the next job in queue in FIG. 4 has an $A_2 S_3$ power profile, whose power consumption is less than the available power margin 71. Thus, the job scheduler 20 determines that the prospective job may be added to the jobs currently running in the datacenter without exceeding the upper datacenter power limit $P_{lim}(u)$. The job scheduler 20 may continue to schedule job requests according to the various policy settings 50, while continually enforcing the power envelope policy setting.

Figure 5:
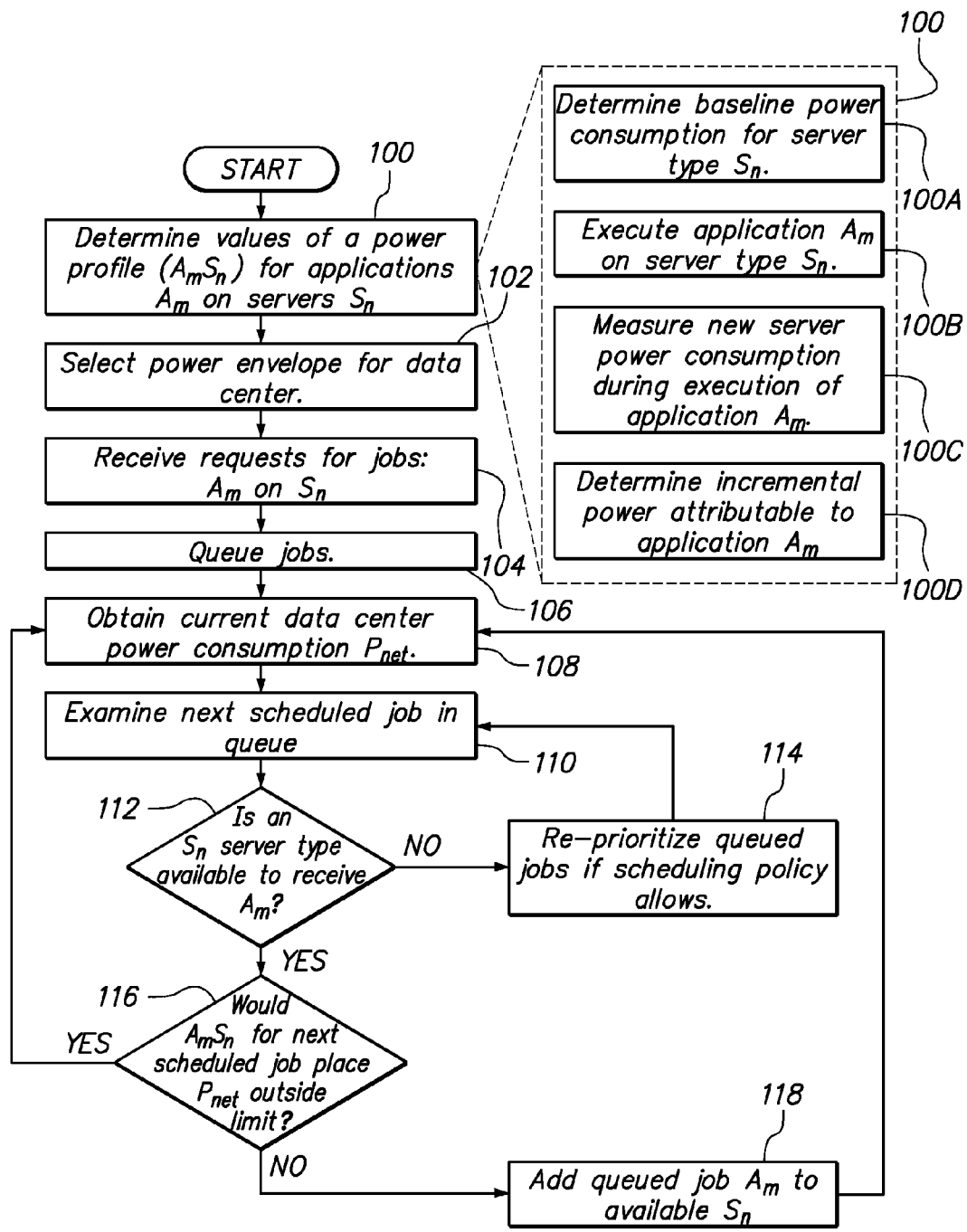
FIG. 5 is a flowchart outlining a method of managing power in a datacenter according to an embodiment of the invention.

FIG. 5 is a flowchart outlining a method of managing power in a datacenter according to an embodiment of the invention. The outlined method incorporates some of the concepts detailed above. In step 100, a power profile is determined for each application $A_m$ and server type $S_n$ that may subsequently be referenced in a job request. In determining each power profile, values of power parameters such as the maximum power consumption $P_{max}$, minimum power consumption $P_{min}$, and average power consumption $P_{ave}$ may be determined. An example subroutine is provided for step 100 that includes sub-steps 100A-100D. In sub-step 100A, a baseline power consumption is determined for a server of type $S_n$. In sub-step 100B, an application $A_m$ is executed on the server. In step 100C, the increased power consumption may be determined during execution of application $A_m$. In step 100D, the incremental power attributable to the execution of application $A_m$ may be determined, such as by subtracting the baseline power consumption determined in sub-step 100A from the increased power consumption determined in sub-step 100C.

In step 102, policy settings for the datacenter, including a target power envelope, are determined. In step 104, one or more job requests are received, each specifying a particular application $A_m$ and server type $S_n$ for each requested job. The jobs are queued in step 106, such as by a job scheduler running on a management server. The jobs scheduler may apply certain scheduling algorithms for allocating nodes to various jobs depending on the job's resource requirements. More specifically, a particular application $A_m$ may be assigned to a particular server $S_n$ that is well suited to handle that particular application $A_m$. The scheduling algorithm may also queue and execute the jobs in an order selected according to various other policy settings, such as a specified job priority (i.e. more important or urgent applications may be assigned a higher priority), fairshare (equally distributing CPU usage among system users or groups), or other scheduling policies. Such policies may affect the order in which the jobs are queued, but an overriding consideration will be to execute the jobs in a manner that is expected to keep the total power consumption $P_{tot}$ of the servers in the datacenter within the limits specified by the power envelope obtained in Step 102.

In step 108, the total power consumption is determined. The total power consumption is typically determined by computing the total power of all of the jobs currently running in the datacenter according to their power profiles determined in step 100. For example the average power consumption of the datacenter may be determined by summing the average power consumption of the individual jobs being run according to their respective power profiles. Likewise, the maximum power consumption of the datacenter may be determined by summing the maximum power consumption of the individual jobs being run, or the minimum power consumption of the datacenter may be determined by summing the minimum power consumption of the individual jobs being run.

The next job in the queue for execution is examined in step 110. In step 112, it is determined whether a server of type $S_n$ is available. In other words, this step identifies which servers that are available and identifies the type of each available server. If a server is not available, then the queued jobs are optionally re-prioritized in step 114 before returning to step 110. One purpose of re-prioritizing jobs in step 116 would be to obtain maximum utilization from the datacenter by operating as near to the upper datacenter power limit as possible. For example, if the available server is type $S_2$, but running the next queued job $A_1$ on that server would exceeding the power limit, it is still possible that the available server $S_2$ could run a different application from the queue without exceeding the power limit.

If a server of type $S_n$ is found to be available in step 112, then step 116 determines whether the power profile $A_mS_n$ for running the next job in the queue on the available server would place the total power consumption outside the power envelope. This may be determined, for example, by adding $P_{max}$ or $P_{ave}$ of the next queued job on the available server to the current total power consumption and then determining whether adding the next-queued job would cause the total power consumption to exceed the upper datacenter power limit. If adding the next queued job to the jobs currently running would cause the total power consumption to exceed the upper datacenter power selected for the datacenter, then the next queued job is not yet added and the process returns to step 108. As jobs are completed, the total power consumption will be reduced until it is determined in a subsequent iteration of step 112 that the next queued job may be added without exceeding the upper datacenter power limit.

However, if the next-queued job can be run on the available server without the total power consumption exceeding the upper datacenter power limit, then the next queued job may simply be added to the available server in step 118. The job queue may be revolving, so that as previously queued jobs are gradually executed in step 118, new job requests may be intermittently received according to step 104. So long as the queue contains a sufficient number of queued jobs that the total power allocated to the queued jobs exceeds the available power in the datacenter, the job scheduler may seek to maximize utilization of the datacenter by operating as closely the upper datacenter power limit as possible.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may be communicated by a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    selecting a power limit for a datacenter having a plurality of servers;
    determining a power consumption attributable to each of a plurality of applications executable on one or more of the servers for each of a plurality of different server types;
    queuing the applications for execution on the servers as jobs; and
    controlling execution of the jobs such that the total power consumption attributable to the applications currently being executed as jobs remains within the selected power limit for the datacenter.

2. The method of claim 1, wherein the step of determining power consumption attributable to each of a plurality of applications executable on one or more of the servers comprises:
    determining a baseline power consumption of a selected server;
    executing a selected application on the selected server; and
    determining the difference between the baseline power consumption and the power consumption of the server during execution of the selected application.

3. The method of claim 1, wherein the power consumption attributable to each application is selected from the group consisting of a minimum power consumption, a maximum power consumption, and an average power consumption attributable to the respective application.

4. The method of claim 1, further comprising:
    executing the queued jobs such that the total power consumption attributable to the currently executed jobs does not exceed a maximum power consumption limit for the datacenter.

5. The method of claim 1, further comprising:
    executing the queued jobs such that the total power consumption attributable to the currently executed jobs does not fall below a minimum power consumption limit for the datacenter.

6. The method of claim 1, further comprising:
    determining a datacenter power margin as the difference between the present total power consumption attributable to the currently executed jobs and an upper power limit for the datacenter; and
    executing the next queued job only if the power consumption attributable to the next queued job is less than the datacenter power margin.

7. The method of claim 6, further comprising:
    determining when one or more presently running jobs has completed and, in response to the completion, repeating the steps of determining the datacenter power margin and executing the next queued job only if the power consumption attributable to the next queued job is less than the datacenter power margin.

8. A computer program product including computer usable program code embodied on a non-transitory computer usable storage medium for managing power in a datacenter, the computer program product including computer usable program code for:
    selecting a power limit for a datacenter having a plurality of servers;
    determining a power consumption attributable to each of a plurality of applications executable on one or more of the servers for each of a plurality of different server types;
    queuing the applications for execution on the servers as jobs; and
    executing the queued jobs such that the total power consumption attributable to the currently executed jobs remains within the selected datacenter power limit.

9. The computer program product of claim 8, wherein the computer usable program code for determining power consumption attributable to each of a plurality of applications executable on one or more of the servers comprises computer usable program code for:
    determining a baseline power consumption of a selected server;
    executing a selected application on the selected server; and determining the difference between the baseline power consumption and the power consumption of the server during execution of the selected application.

10. The computer program product of claim 8, wherein the power consumption attributable to each application is selected from the group consisting of a minimum power consumption, a maximum power consumption, and an average power consumption attributable to the respective application.

11. The computer program product of claim 8, further comprising:
computer usable program code for executing the queued jobs such that the total power consumption attributable to the currently executed jobs does not exceed a maximum power consumption limit for the datacenter.

12. The computer program product of claim 8, further comprising:
computer usable program code for executing the queued jobs such that the total power consumption attributable to the currently executed jobs does not fall below a minimum power consumption limit for the datacenter.

13. The computer program product of claim 8, further comprising computer usable program code for:
determining a datacenter power margin as the difference between the present total power consumption attributable to the currently executed jobs and an upper power limit for the datacenter; and
executing the next queued job only if the power consumption attributable to the next queued job is less than the datacenter power margin.

14. The computer program product of claim 13, further comprising computer usable program code for determining when one or more presently running jobs has completed and, in response to the completion, repeating the steps of determining the datacenter power margin and executing the next queued job only if the power consumption attributable to the next queued job is less than the datacenter power margin.

* * * * *